United States Patent
Zhang et al.

(10) Patent No.: US 12,205,109 B2
(45) Date of Patent: Jan. 21, 2025

(54) GENERATING SEQUENCES OF NETWORK NODES

(71) Applicant: International Business Machines Corporation, Armonk, NY (US)

(72) Inventors: Li Zhang, Beijing (CN); Shi Lei Zhang, Beijing (CN); Toyotaro Suzumura, New York City, NY (US); Keith Coleman Houck, Rye, NY (US); Ryo Kawahara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 17/120,150

(22) Filed: Dec. 12, 2020

(65) Prior Publication Data
US 2022/0188813 A1 Jun. 16, 2022

(51) Int. Cl.
*G06Q 20/38* (2012.01)
*H04L 9/40* (2022.01)

(52) U.S. Cl.
CPC ....... *G06Q 20/382* (2013.01); *H04L 63/1425* (2013.01); *H04L 63/1483* (2013.01)

(58) Field of Classification Search
CPC ............. G06Q 20/382; H04L 63/1425; H04L 63/1483
See application file for complete search history.

(56) References Cited

U.S. PATENT DOCUMENTS

| | | | |
|---|---|---|---|
| 8,779,921 B1* | 7/2014 | Curtiss | G08B 25/009 340/541 |
| 11,556,636 B2* | 1/2023 | Neil | G06F 21/554 |
| 2016/0042355 A1* | 2/2016 | Wang | G06Q 20/4014 705/39 |
| 2016/0364794 A1 | 12/2016 | Chari et al. | |
| 2018/0196694 A1* | 7/2018 | Banerjee | G06F 9/466 |
| 2019/0207960 A1 | 7/2019 | Chu et al. | |
| 2019/0259033 A1* | 8/2019 | Reddy | G06N 5/02 |
| 2021/0117978 A1* | 4/2021 | Silva | G06Q 20/4016 |

FOREIGN PATENT DOCUMENTS

| | | |
|---|---|---|
| CN | 110400220 A | 11/2019 |
| CN | 111090780 A | 5/2020 |

OTHER PUBLICATIONS

Kumar et al., "2Scent: An Efficient Algorithm for Enumerating All Simple Temporal Cycles," Proceedings of the VLDB Endowment, vol. 11, No. 11, Aug. 2018, pp. 1441-1453.
Cai et al., "A Comprehensive Survey of Graph Embedding: Problems, Techniques, and Applications", IEEE Transactions on Knowledge and Data Engineering, vol. 30, No. 9, Sep. 2018, Digital Object Identifier No. 10.1109/TKDE.2018.28, 22 pages.
Grover et al., "node2vec: Scalable Feature Learning for Networks", KDD '16, Aug. 13-17, 2016, San Francisco, CA, USA, DOI: http://dx.doi.org/10.1145/2939672.2939754, pp. 855-864.

* cited by examiner

*Primary Examiner* — Azam A Ansari
(74) *Attorney, Agent, or Firm* — Kelsey M. Skodje

(57) ABSTRACT

A suspicious pattern can be detected within a transaction network of nodes. Nodes of the network are walked by determining if any adjacent node to a current node is within the suspicious pattern. If an adjacent node is within the suspicious pattern, that node is walked to. Based on the walk, a node sequence can be generated.

20 Claims, 8 Drawing Sheets

GENERATING SEQUENCES OF NETWORK NODES

BACKGROUND

Financial institutions may monitor transactions occurring amongst accounts in order to detect and curb fraudulent activity. Transactions between accounts are often organized into a "transaction network," with nodes representing accounts and edges that connect the nodes representing transactions between the accounts. As transaction networks can be exceedingly large (billions of nodes and edges), monitoring the entire network is generally considered unfeasible. Thus, monitoring is often performed via "walking" portions of a transaction network. For example, a system may select a first node, detect adjacent nodes that the first node transferred funds to, select an adjacent node at random, and "walk" from the first node to the selected adjacent node. The system may repeat this process from the selected adjacent node, monitoring the walked transactions to determine whether they are suspicious.

SUMMARY

Some embodiments of the present disclosure can be illustrated as a method. The method comprises detecting a suspicious pattern in a subnet of a transaction network, the suspicious pattern including a first set of nodes. The method further comprises walking nodes in the subnet based on the suspicious pattern, the walking including identifying a second set of nodes adjacent to a current node, determining that an adjacent node of the second set of nodes is included in the first set of nodes, and selecting the adjacent node, the selecting based on the adjacent node being included in the first set of nodes. The method further comprises generating, based on the walking, a node sequence of nodes of the subnet, the node sequence including the selected node.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
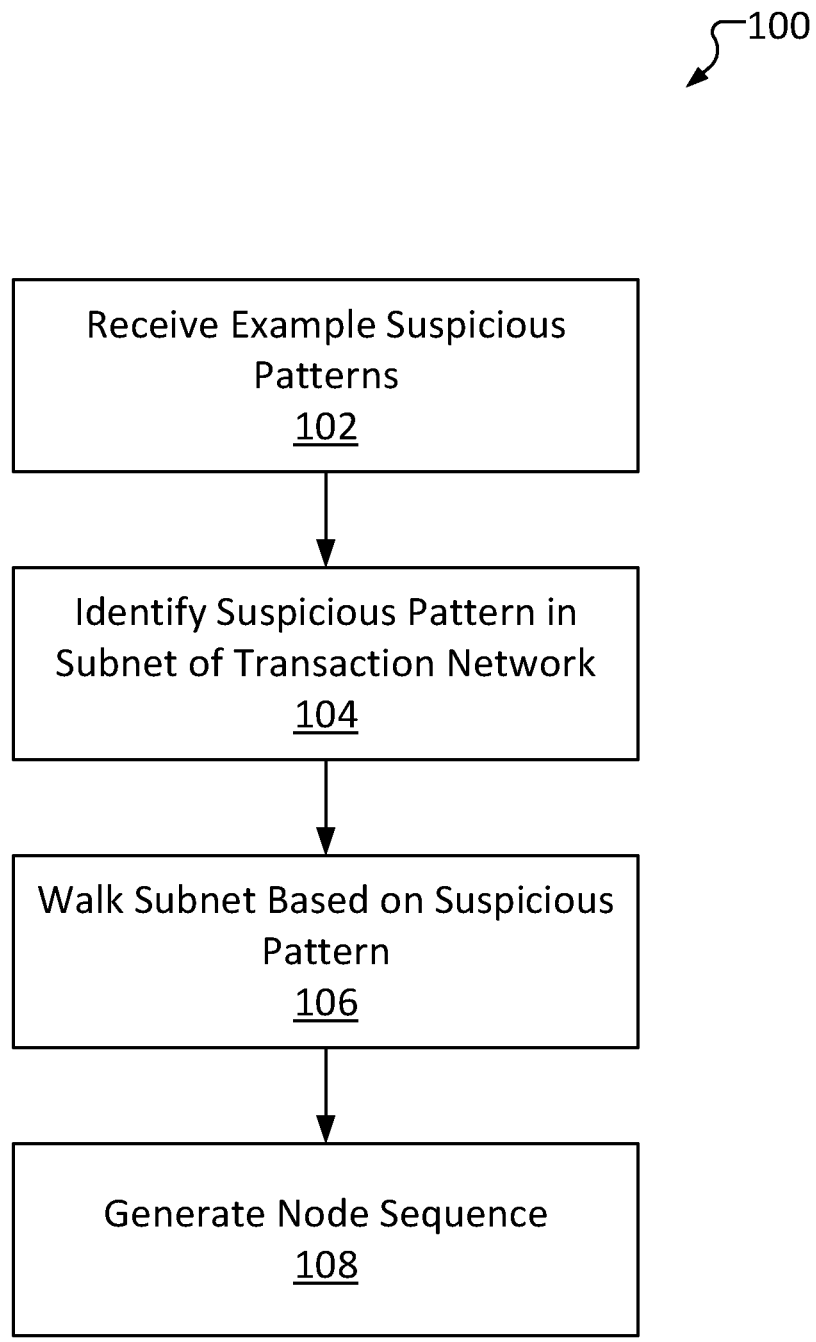
FIG. 1 is a high-level method of walking a transaction network based on suspicious patterns, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to generate a sequence of nodes in a transaction network based on a suspicious pattern in the transaction network. More particular aspects relate to a system to identify a suspicious pattern in a transaction network, walk the transaction network based on the suspicious pattern, and generate a node sequence based on the walk.

As reviewing every transaction in a transaction network is generally considered unfeasible due to the size and extent of typical networks, many systems "walk" through a portion of a transaction network in an attempt to find evidence of any fraudulent activity. However, typical systems may walk transaction networks at random (referred to as "random walks"). Increasing the number (or length) of random walks performed typically results in higher chances of detecting fraudulent activity, but also increase resources required. However, systems and methods consistent with the present disclosure can advantageously improve node selection for walks in order to bias a walk toward suspicious patterns, thereby further improving chances of detecting fraudulent activity with relatively lower resource usage compared to random walking.

Figure 3:
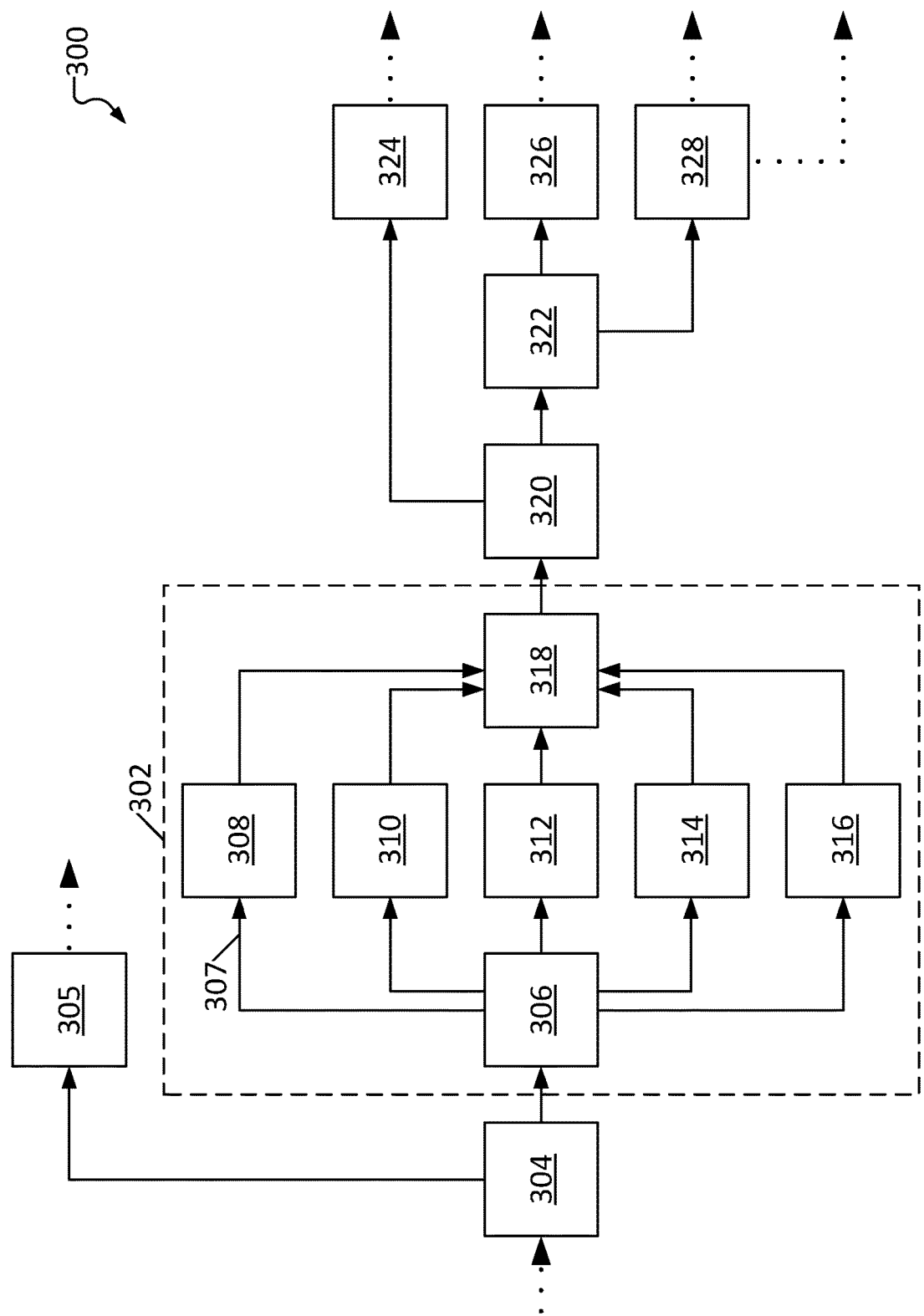
FIG. 3 is a diagram of an example transaction subnetwork including a detected suspicious pattern, consistent with several embodiments of the present disclosure.

Throughout this disclosure, reference is made to "transaction networks." A transaction network, as discussed herein, is a mapping of interconnected nodes. Each node represents a financial account, while connections between the nodes represent transactions (transfers of funds between the accounts). Nodes that are connected by a transaction are described herein as being "adjacent" to one another. Systems and methods of the present disclosure may focus on a portion of a transaction network such as a set of nodes, referred to as a subnetwork or "subnet." An example transaction subnet is depicted in FIG. 3, discussed in further detail below.

Throughout this disclosure, reference is made to "suspicious patterns" within a transaction network. As used herein, a "suspicious pattern" refers to a group of nodes connected via transactions that are arranged in a manner commonly associated with fraudulent activity.

Suspicious patterns discussed in the present disclosure include "fan-out" patterns, "fan-in" patterns, "fan-out/fan-in" patterns, "cycle" patterns, and "mule" patterns. A "fan-out" pattern may comprise a group of nodes where a first node transfers funds to a large set of nodes (e.g., 5 or more) within a short time period (e.g., 10 seconds). The "fan-out" may be grouped with a "fan-in" pattern, where the large set of nodes all transfer funds to a single node (often different than the first node of the fan-out). When paired together, this may be referred to as a "fan-out/fan-in" pattern. A "cycle" refers to a group of nodes wherein a first node transfers funds to a second node, the second node transfers funds to a third node, and so on, until a final node transfers funds to the first node as well as an external node. Notably, the transfers within the "cycle" are sequential; for example, an arrangement where a first node transfers funds to a second node, then a third node transfers funds to the first node, and then the second node transfers funds to the third node may not qualify as a cycle. A "mule" pattern may be considered the opposite of a "fan-out/fan-in" pattern; a "mule" pattern generally comprises a first large set of nodes transferring funds to a single intermediary node, which then transfers funds to a second large set of nodes.

Systems and methods consistent with the present disclosure may receive example suspicious patterns (such as from a database or input by a user). Example suspicious patterns may be compared to a transaction subnet in order to determine if the subnet includes a suspicious pattern. For example, a "fan-out" pattern describes a single account that has transferred funds to multiple different accounts simultaneously (or near-simultaneously). A system may receive an example fan-out pattern, then use the example fan-out pattern to detect a fan-out pattern in a transaction subnet (via, for example, pattern matching). Suspicious patterns may be revised over time, to account for changing methodologies of fraudulent users. Timing may also determine whether a pattern is suspicious or not; for example, some patterns may only be suspicious if certain transactions are simultaneous (or nearly simultaneous).

A suspicious pattern within a transaction subnet is not necessarily fraudulent. However, many common types of fraudulent activity share similar patterns. Thus, detecting suspicious patterns can be a useful tool in monitoring for fraudulent activity.

In order to better evaluate whether or not a suspicious pattern is evidence of actual fraud, systems and methods of the present disclosure may determine an "importance" of the suspicious pattern. Pattern importance can be determined based on, for example, a magnitude of funds transferred through or within the pattern. This can help distinguish actual fraudulent activity from coincidental patterns.

Other factors used in determining importance can include degree, describing a number of transactions within or into/out of the pattern. For example, a pattern including six accounts and eight transactions may be considered less important than a similar pattern including six accounts and fourteen transactions.

Nodes within a suspicious pattern also have "importance"; if a pattern involves transfers to five different accounts, where a first account of the five receives significantly more funds than the other four, the first account is generally more "important."

The combination of identifying a suspicious pattern, determining its importance, and performing a walk that includes selecting nodes based on the suspicious pattern advantageously improves efficiency in detecting fraudulent activity. This can reduce computational resources required to monitor transaction networks for fraud.

FIG. 1 is a high-level method 100 of walking a transaction network based on suspicious patterns, consistent with several embodiments of the present disclosure. Method 100 comprises receiving example suspicious patterns at operation 102. Operation 102 may include receiving a set of one or more example suspicious patterns from a database. For example, a system performing method 100 may access an online database of suspicious patterns and download example suspicious patterns. Operation 102 may also include receiving example suspicious patterns via a user input.

Method 100 further comprises identifying a suspicious pattern in a subnet of a transaction network at operation 104. Operation 104 may include, for example, utilizing a pattern matching algorithm to detect that a pattern in the transaction network matches an example suspicious pattern (such as one received at operation 102). The pattern matching may be performed on a subnet in order to improve performance of a system performing method 100, as performing pattern matching upon the entire transaction network may be prohibitively resource-intensive. Operation 104 may also include identifying a list of nodes in the subnet that are within the suspicious pattern. Multiple suspicious patterns may be present within the same subnet. Suspicious patterns may also "overlap"; for example, a first node may be contained within both a "fan-out" suspicious pattern as well as a "cycle" suspicious pattern.

Method 100 further comprises walking the subnet at operation 106. A path taken during the walk may be based on the suspicious pattern. Operation 106 may include, for example, selecting a "start" node of the subnet, analyzing transactions from the start node to any adjacent nodes, selecting one of the adjacent nodes, and repeating the analysis. The manner in which the next node is selected can be affected by the suspicious pattern, resulting in an improved chance that the walk traverses the suspicious pattern. Selection of the next node for the walk based on the suspicious pattern is described in further detail below with reference to FIG. 2.

In some instances, more than one adjacent node may be selected. This may be advantageous if, for example, multiple adjacent nodes are within suspicious patterns. For example, if a first adjacent node is within a first suspicious pattern and a second adjacent node is within a second suspicious pattern, both nodes may be selected for analysis. Similarly, if both the first and second adjacent nodes are within the same suspicious pattern and both nodes are at least somewhat "important," both nodes may be selected. This is discussed in further detail below, with reference to FIG. 2

Operation 106 may further include recording information regarding nodes traversed during the walk. As each node in the transaction network (and therefore the subnet) corresponds to an account, operation 106 may therefore include recording information regarding the accounts corresponding to walked nodes. For example, at each node of the walk, operation 106 may include recording an account holder's name, an account age, a current and/or maximum amount of funds stored in the account, etc.

Method 100 further comprises generating a node sequence of the walk at operation 108. Operation 108 may include, for example, generating a vector or other data structure (array, table, etc.) describing the nodes walked during operation 106. As an example, a walk performed during operation 106 may have walked from node 1, to node 3, and finally to node 7. Operation 108 may thus include generating a list of which nodes were visited during the walk and including that list in a vector, such as [1, 3, 7]. Operation 108 may further include associating the information about the various accounts & transactions (which may be recorded via operation 106) with the node sequence. Continuing with the previous example, nodes 3 and 7 may be within a suspicious pattern and node 1 may not be within any suspicious pattern. In such an example, operation 108 may include generating a series of number pairs such as [(1,0); (3,1);(7,1)], where the first digit of each pair (i.e., 1, 3, 7) indicates which node was visited, while the second digit indicates whether the node was within a suspicious pattern. This node sequence (and associated information) may be packaged into an output that may eventually be utilized for further analysis of the nodes and any suspicious patterns traversed during the walk. For example, the node sequence may be utilized as input to a Skip-Gram algorithm, which in turn may determine whether the suspicious pattern is actually fraudulent.

Depending upon the walk, the sequence generated may indicate multiple adjacent nodes. For example, if more than one adjacent node was selected during a single step of the walk performed at operation 106, the sequence generated via operation 108 may include each selected node.

Figure 2:
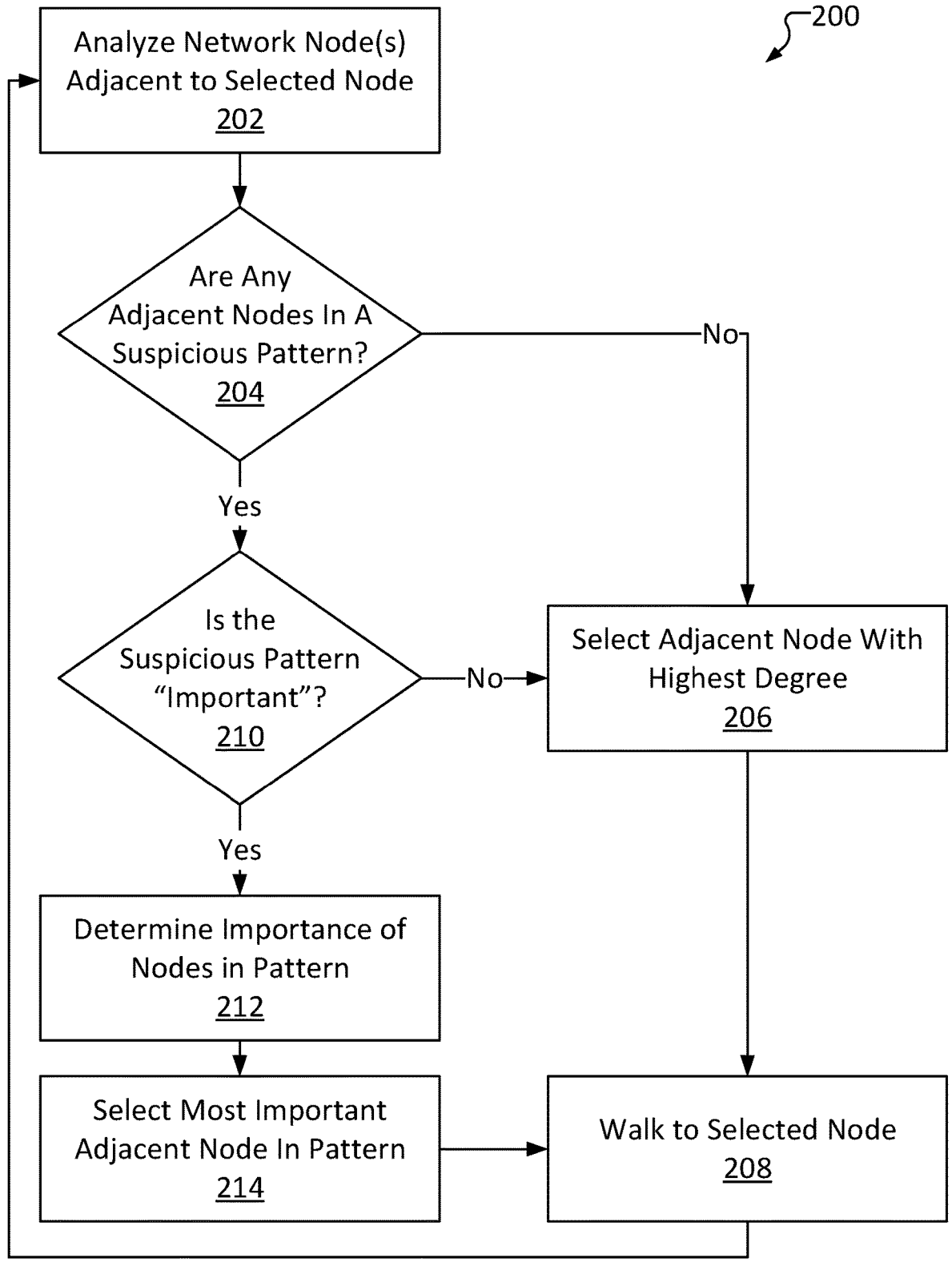
FIG. 2 is a detailed example method of selecting nodes to walk in a transaction network based on detected suspicious patterns, consistent with several embodiments of the present disclosure.

FIG. 2 is a detailed example method 200 of selecting nodes to walk in a transaction network based on detected suspicious patterns, consistent with several embodiments of the present disclosure. The walk described in FIG. 2 may be performed after identification of a suspicious pattern in a subnet (such as via operation 104, discussed with reference to method 100 of FIG. 1, above). Method 200 may be performed after selection of a "starting" node in a subnet, which may be chosen at random.

Method 200 comprises analyzing network nodes adjacent to a selected node at operation 202. Operation 202 may include, for example, identifying various accounts that the selected node is connected to via a transaction ("edge"). In other words, operation 202 includes identifying accounts that the selected account has transferred funds to. Notably, an account that the selected account has received funds from is not necessarily considered "adjacent" for purposes of this disclosure (unless, of course, the selected account has also transferred funds to the account in question). If only a single node is adjacent to the selected node, operation 202 may simply include selecting the adjacent node, walking to it, and repeating the analysis on the newly-selected node. The "selected node" may initially be a starting node of a subnet walk, while subsequent iterations of operation 202 may be performed based on different selected nodes as the walk proceeds. A system performing method 200 may maintain a register storing an identifier to indicate which node of the subnet is currently "selected." The system may similarly store an identifier to indicate which suspicious pattern (if any) the currently selected node is within.

Method 200 further comprises determining whether any of the identified adjacent nodes are within a suspicious pattern (such as, for example, a "fan-out" pattern detected within the subnet) at operation 204. Operation 204 may include, for example, comparing each adjacent node to a list of nodes in the subnet known to be within suspicious patterns. For example, upon initial detection of a fan-out pattern in the subnet, a list of subnet nodes that are within the fan-out pattern may be generated. Thus, operation 204 may include comparing adjacent nodes to such a list.

If no adjacent nodes are within a suspicious pattern (204 "No"), method 200 further comprises selecting an adjacent node having a highest degree at operation 206. A given node's degree describes the number of nodes adjacent to the given node. In other words, a node's degree describes the number of accounts that an account associated with the node has transferred funds to. For example, a first account A (represented in the subnet by node A) may have transferred funds to two accounts (second account B and third account C, represented in the subnet by node B and node C, respectively). Node A's degree would therefore be "2." If account B has transferred funds to exactly seven accounts, node B's degree is "7." If account C has only transferred funds to a single account, node C's degree is "1." In such an example, if node A is the current selected node, operation 206 may include selecting node B, as its degree (7) is higher than node C's degree (1). This may advantageously increase the chance that one of the next adjacent nodes will be within a suspicious pattern. For example, when analyzing the seven nodes adjacent to node B during a next iteration of operation 202, there may be a substantially greater chance that one of those seven adjacent nodes is within a suspicious pattern than when analyzing the single node adjacent to node C. In some instances, such as if all adjacent nodes have the same degree, operation 206 may further include selecting a node associated with the most significant transfer of funds. In some instances, if no better candidate can be identified (e.g., all adjacent nodes have the same degree and transfer magnitude, etc.), operation 206 may include selecting an adjacent node at random.

Selecting by degree (as in operation 206) may typically yield the best chance of a node adjacent to the newly-selected node being within a suspicious pattern. However, malicious actors may attempt to take advantage of a known selection algorithm in order to obscure fraudulent transfers with various "decoy" transfers and/or "throwaway" accounts. Thus, other factors besides degree are also considered herein, such as, for example, magnitude of transactions sent to the adjacent nodes. As an illustrative example, rather than perform operation 206, in response to a system determining that no adjacent nodes are within a suspicious pattern (or the suspicious patterns containing adjacent nodes are unimportant), the system may select the adjacent node that has received the largest magnitude of funds from the current node.

In some embodiments, a system may utilize a "weighted random" selection policy. For example, a system may provisionally select a next node based upon degree, then determine, based on a random chance (e.g., 30%), whether or not to override the selection with a different adjacent node if possible. This may retain benefits of trending towards walking through suspicious patterns, but introduce a random element so as to mitigate attempts to "mislead" the system.

If an adjacent node is within a suspicious pattern (204 "Yes"), method 200 further comprises determining whether the suspicious pattern is important at operation 210. Operation 210 may include, for example, determining a timing and/or magnitude of funds transferred into, within, or through the accounts included within the pattern. As an illustrative example, in certain implementations, a suspicious pattern may be considered important if $100,000.00 US has been transferred into accounts represented by nodes within the pattern, and if the transfer(s) occurred within a single day. Determining importance of a suspicious pattern is explained in additional detail with reference to method 400 of FIG. 4, below.

In some situations, multiple adjacent nodes may be within different suspicious patterns. If multiple adjacent nodes are within different suspicious patterns, operation 210 may further include ranking importance of the suspicious patterns, or otherwise selecting a suspicious pattern as "most important." Further, different suspicious patterns may "overlap"; a single node may belong to more than one suspicious pattern. Examples are provided and discussed below with reference to subnet 600 of FIG. 6.

If the suspicious pattern is unimportant (i.e., has an importance score below a threshold; 210 "No"), then it may be unlikely that the suspicious pattern is an actual instance of fraudulent activity, so method 200 reverts to selecting the adjacent node with the highest degree at operation 206. However, if operation 206 is performed in response to 210 "No," operation 206 may include selecting the adjacent node within the unimportant suspicious pattern as a "tiebreaker." For example, in choosing between two adjacent nodes, each having the same degree, where one is within an unimportant suspicious pattern and one is not within any suspicious pattern, operation 206 may include selecting the node within the unimportant suspicious pattern.

If the suspicious pattern is important (i.e., has an importance score above a threshold; 210 "Yes"), then the suspicious pattern may be evidence of fraudulent activity, and method 200 further comprises determining importance of each adjacent node that is within the suspicious pattern at operation 212. Operation 212 may include, for example, determining a magnitude of funds transferred to each adjacent node within the suspicious pattern. Importance of the suspicious pattern itself ("pattern importance") generally refers to overall totals transferred to and/or from the various nodes within the pattern, while each node within the pattern has its own "node importance." As an illustrative example, operation 212 may include determining that a first (of two) adjacent node within a given suspicious pattern has received $35,000.00 US while the second adjacent node within the important suspicious pattern has received $65,000.00 US. Node importance can also be based upon other factors besides magnitude of funds transferred such as, for example, a number of transfers to the node in question, a frequency of transfers, etc. As an example, a selected node transferring funds multiple times every day to an adjacent node may result in the adjacent node having a higher node importance than if the same total amount of funds were transferred all at once. Determining importance of a node (sometimes referred to as determining a "node importance" of a node) within an important suspicious pattern is described in further detail below with reference to method 500 depicted in FIG. 5. Method 200 further comprises selecting the adjacent node within the important suspicious pattern having the highest node importance at operation 214. Operation 214 may include, for example, comparing node importance of each node within the important suspicious pattern, and selecting the node having the highest node importance. As an illustrative example, a first (of two) adjacent node within a given suspicious pattern may have received $35,000.00 US while the second adjacent node within the important suspicious pattern may have received $65,000.00 US. In such an example, operation 214 may include selecting the second node.

In some embodiments, operation 214 may allow selection of multiple nodes; for example, operation 214 may include comparing the node importance of each adjacent node within the important suspicious pattern to a node importance threshold, and selecting each node whose node importance exceeds the node importance threshold. In such embodiments, "selecting" may include flagging one or more of the "extra" nodes to be analyzed later. As an illustrative example, a selected node may have three adjacent nodes within the same suspicious pattern, a node's importance may be solely dependent upon total funds transferred to the node, and a node importance threshold may be $800.00 US. If the selected node transferred $905.00 US to the first adjacent node, $205.00 US to the second adjacent node, and $1,300.00 US to the third adjacent node, operation 214 may include selecting the third adjacent node (as it has the largest magnitude, and thus the highest importance) and flagging the first adjacent node to be revisited/analyzed later. The first adjacent node may be flagged because its node importance is above the node importance threshold. As the node importance of the second adjacent node is below $800.00 US, the second adjacent node is neither selected nor flagged.

Only adjacent nodes within the important suspicious pattern may be evaluated for purposes of operations 212 and 214. For example, selected node X may have transferred a first amount of funds to a first node Y. Node X may also have transferred a second amount of funds to a second node Z. If node Z is within an important suspicious pattern and node Y is not, operation 212 may not include determining importance of node Y. Thus, even if the first amount of funds (sent to node Y) is greater than the second amount of funds (sent to node Z), operation 214 may regardless include selecting node Z. This is advantageous because innocent transfers of significant funds (such as the transfer to node Y) may otherwise "distract" a system performing method 200; the best way to detect fraudulent activity is to walk the (important) suspicious patterns.

In addition, in order to enable analysis of a suspicious pattern, it may be beneficial to walk through several different nodes within the pattern. Thus, should the currently selected node be within a suspicious pattern (which may be noted as part of operation 202), it may be advantageous to select nodes that are within the same suspicious pattern. Therefore, in some instances, operation 214 may include selecting the most important node within the same suspicious pattern as the currently selected node, effectively disregarding/disqualifying adjacent nodes that are not in the same suspicious pattern from being selected. However, in some instances, adjacent nodes within important suspicious patterns may only be disregarded/disqualified from selection if the current node is in a suspicious pattern that is not determined to be important. This is discussed in further detail with reference to subnet 700 of FIG. 7, below.

Once a next node is selected, in either operation 206 or operation 214, method 200 further comprises walking to the selected node at operation 208. Operation 208 may include, for example, updating an identifier register in order to reflect that the adjacent node is now the "selected" node. Operation 208 may also include recording information of the newly-selected node as well as the transaction connecting the previous node to the newly-selected node.

Once the newly-selected node has been walked to, Method 200 may then return to operation 202, looping until one of several possible exit conditions has been met. For example, an "end" node may have been identified prior to initiating method 200; if the newly-selected node is the "end" node, method 200 may end instead of returning to operation 202. Further, if the newly-selected node has no adjacent nodes (i.e., a degree of "0"), then method 200 may end. In some instances, a "maximum walk length" may be utilized; in such instances, operation 208 may also include incrementing a counter and comparing the counter to a threshold. Method 200 may thus end once the counter exceeds the threshold, indicating that the walk has analyzed the preset number of nodes.

FIG. 3 is a diagram of an example transaction subnetwork 300 including a detected suspicious pattern 302, consistent with several embodiments of the present disclosure. Subnet 300 includes a plurality of nodes 304-328, wherein each node is connected to at least one adjacent node via a transaction. Transactions are depicted in FIG. 3 as arrows connecting two nodes; for example, a transfer of funds from node 306 to node 308 is labeled transaction 307. In the interest of brevity, most transactions are not explicitly labeled in FIG. 3. For purposes of this disclosure, transactions are described using the following notation: [Sending-Node-ReceivingNode]. For example, transaction 307, representing a transfer of funds from node 306 to node 308, is described in this disclosure as transaction [306-308].

Subnet 300 may be a small portion of an overall transaction network. As transaction networks may include billions of nodes and edges, monitoring entire transaction networks for fraudulent activity is generally considered unfeasible/prohibitively expensive. Thus, subnets (such as subnet 300) are utilized in monitoring for fraudulent activity. Subnet 300 may be generated at random, such as by selecting a "start" node at random from the entire transaction network, selecting an "end" node that is a preset number of "steps" from the start node, and including all nodes in between.

Suspicious pattern 302 may be identified after subnet 300 is generated. For example, a system generating subnet 300 may identify suspicious pattern 302, or the system generating subnet 300 may transmit subnet 300 to a different system, which may then identify suspicious pattern 302 upon receipt of subnet 300. Suspicious pattern 302 may be identified by, for example, performing one or more pattern matching algorithms on subnet 300 using one or more example suspicious patterns as a basis for comparison. The suspicious pattern 302 depicted in FIG. 3 is an example of a "fan-out/fan-in" pattern; funds are transferred from a single node (306) to a number of different nodes (308, 310, 312, 314, 316), and then back to a different single node (318). The transfers from 306 to nodes 308-316 may have occurred within a maximum length of time, such as simultaneously or near-simultaneously (e.g., within 1 second, within 10 seconds, etc.). This pattern is commonly affiliated with various attempts to launder money by channeling it through multiple intermediary accounts so as to conceal its source.

In order to more closely monitor for fraudulent activity, subnet 300 may be "walked," wherein one node may be analyzed at a time. It may be advantageous for a system performing a walk of subnet 300 to walk through suspicious patterns, as this may enable recording of more relevant information for later analysis. In other words, a walk starting at node 304, selecting node 305, and ending there would fail to record information regarding suspicious pattern 302. Thus, the system performing the walk may be configured to prefer walking "towards" suspicious patterns.

For example, a walk may start at node 304, including analyzing account information associated with an account corresponding to node 304. The walk may also include identifying adjacent nodes (nodes with which node 304 transacts directly). In subnet 300, nodes 305 and 306 are adjacent to node 304. In order to choose between nodes 305 and 306, a system may determine whether either of nodes 305 and 306 are within a suspicious pattern. As node 306 is within suspicious pattern 302, the system may select node 306.

In some embodiments, before selecting node 306 simply for being within pattern 302, the system may first determine whether suspicious pattern 302 is "important." This may include, for example, determining a total magnitude of transfers into, out of, and/or within pattern 302, and comparing the total magnitude to a threshold. For example, a total magnitude of transfers into pattern 302 may be the magnitude of transfer [304-306]. A total magnitude of transfers within pattern 302 may be a sum of magnitudes of transfers [306-308], [306-310], [306-312], [306-314], [306-316], [308-318], [310-318], [312-318], [314-318], and [316-318]. A total amount sent out of pattern 302 may be the magnitude of transfer [318]-[320]. In some instances, other factors may be utilized to "weight" the calculated magnitude. For example, transfer [304-305] may be evaluated to determine whether transfer [304-306] is abnormally large (or small). These weights are discussed in further detail below with reference to method 400 of FIG. 4. For purposes of FIG. 3, pattern 302 is assumed to be an important suspicious pattern. However, even if pattern 302 were unimportant, node 306 has a greater degree (5) than node 305 (1), so the system may select node 306 anyway.

When walking to node 306, a system may record information about node 304, node 306, and/or transaction [304-306]. For example, the system may record account information regarding accounts corresponding to node 304 and node 306 such as, for example, accountholder identity, account age, historical transactions between node 304 and 306, etc. The system may also (or alternatively) record transaction information regarding transaction [304-306] such as, for example, an amount of the transaction, a date/time of the transaction, a method used to execute the transaction (e.g., check, wire transfer, etc.), a memo associated with the transaction, etc.

The system performing the walk may then determine a next node to select. As nodes 308, 310, 312, 314, and 316 ("nodes 308-316") are all adjacent to node 306 and are all within important suspicious pattern 302, the system may determine a node importance of each of nodes 308-316. Node importance may be determined based upon magnitude of a transaction to the node; for example, node importance of node 308 may be determined based upon a magnitude of transaction [306-308] (which is labeled 307 in FIG. 3). The system may then walk to the node having the highest importance. For example, if transaction [306-308] included a transfer of $300.00 USD and transactions [306-310], [306-312], [306-314], and [306-316] all included transfers of less than $50.00, the system may select node 308.

Once a node has been selected, the walk repeats the analysis. However, as each of nodes 308-316 all have a single adjacent node (node 318), node 318 is the only option for the next selection. Thus, the walk proceeds to node 318. Similarly, the walk proceeds from node 318 to node 320. Node 320 has two adjacent nodes (node 324 and node 322), neither of which are within a suspicious pattern (let alone an important suspicious pattern). Thus, the system may opt to select the node having the highest degree. Since node 324 has a degree of (1) and node 322 has a degree of (2), the system may select and walk to node 322. A similar analysis may be performed upon node 322, resulting in selection of node 328 as its degree (2) is greater than the degree of node 326 (1). However, in some instances, one of node 326 or 328 may be an "end" node; in such instances, the system may walk to the end node regardless of degree or other considerations.

In some embodiments, more than one of nodes 308-316 may be selected. For example, rather than select the node having the highest node importance, the system may compare the node importance of each of nodes 308-316 to a threshold, and select any and all nodes having a node importance above the threshold. If multiple nodes are selected, the walk may continue with one of the selected nodes until the walk is completed, and then the walk may be performed again using the other selected node. For example, if nodes 308 and 312 are selected, a walk may be represented by the following first node sequence: 304, 306, 308, 318, 320, 322, 328. Once the walk is completed, a second walk may be performed represented by the following second node sequence: 304, 306, 312, 318, 320, 322. These two node sequences may be combined into the following overall node sequence: 304, 306, 308+312, 320, 322. This node sequence may be associated with information from each walk (excluding redundant information). For example, the first node sequence may include information regarding nodes 304, 306, 308, 318, 320, 322, and 328, as well as transfers [304-306], [306-308], [308-318], [318-320], [320-322], [322-328]. The second node sequence may include information regarding nodes 304, 306, 312, 318, 320, 322, and 328, as well as transfers [304-306], [306-312], [312-318], [318-320], [320-322], [322-328]. When the node sequences are combined, the combined sequence may include information regarding nodes 304, 306, 308, 312, 318, 320, 322, and 328, as well as transfers [304-306], [306-308], [306-312], [308-318], [312-318], [318-320], [320-322], and [322-328].

Figure 4:
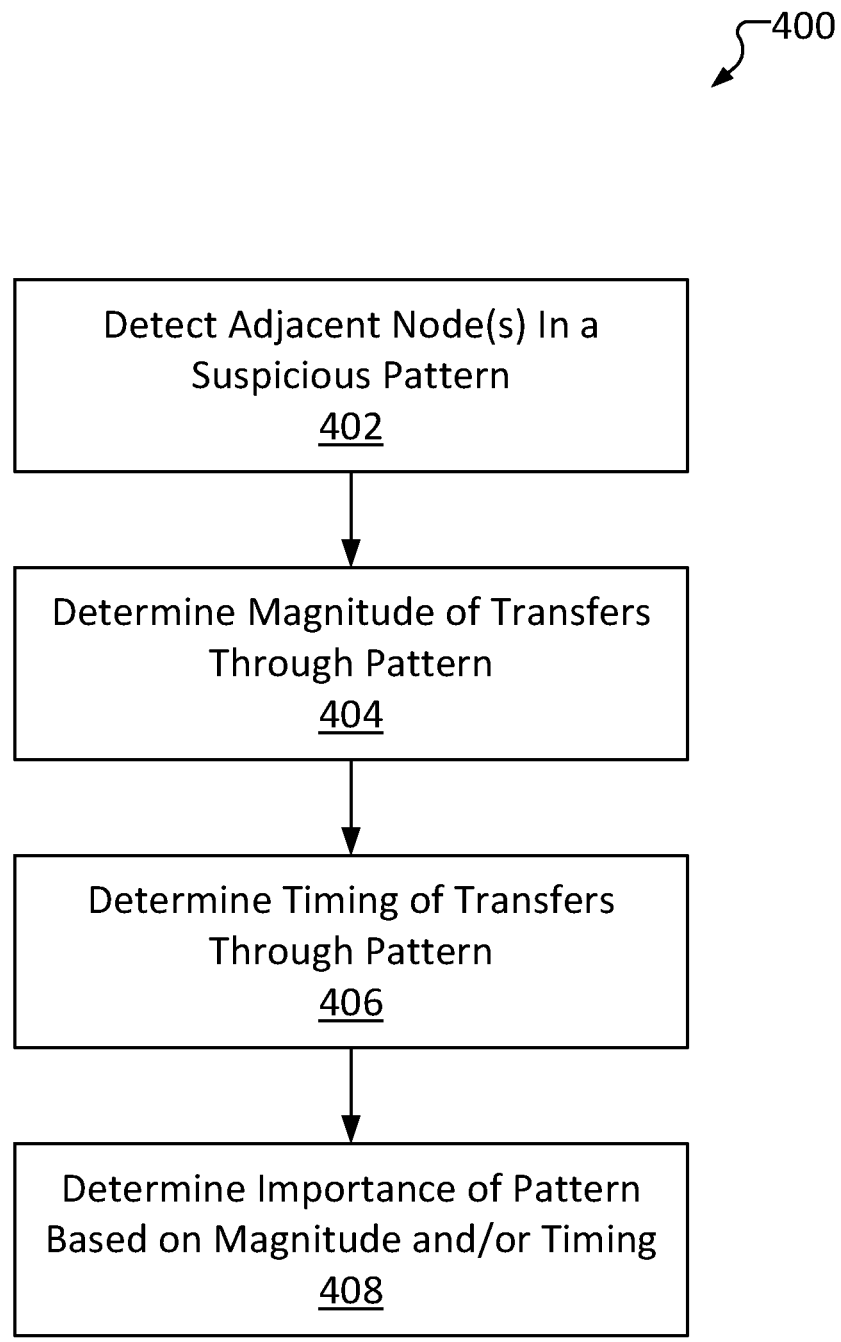
FIG. 4 is an example method of determining an importance of a suspicious pattern, consistent with several embodiments of the present disclosure.

FIG. 4 is an example method 400 of determining an importance of a suspicious pattern, consistent with several embodiments of the present disclosure. Method 400 comprises detecting one or more adjacent nodes within a suspicious pattern at operation 402. The node(s) within the suspicious pattern may be adjacent to a "current" node being analyzed. Operation 402 may include, for example, comparing identifying information of each adjacent node to a list of nodes within the suspicious pattern. Briefly referring back to FIG. 3 as an illustrative example, a system analyzing node 304 may determine that nodes 305 and 306 are adjacent to node 304. Subnet 300 may include a list of nodes within suspicious pattern 302 (i.e., nodes 306, 308, 310, 312, 314, 316, and 318), so the system analyzing node 304 may check this list to see if either of nodes 305 or 306 are within pattern 302.

Returning to FIG. 4, method 400 further comprises determining an amount of funds being transferred into, out of, and/or within the suspicious pattern at operation 404. For example, a system performing method 400 may determine a magnitude of transactions from nodes outside the pattern to nodes within the suspicious pattern ("incoming transactions"). Using suspicious pattern 302 of FIG. 3 as an example, a system may determine a magnitude of transaction [304-306], as node 304 is outside suspicious pattern 302 and node 306 is within suspicious pattern 302. Further, the system may determine a magnitude of each transfer between multiple nodes within the suspicious pattern ("internal transactions"). In addition, the system may determine a magnitude of any transfers from nodes within the pattern to nodes outside the pattern ("outgoing transactions"). The determined magnitudes may be summed into a total amount associated with the pattern.

However, in some embodiments, the total amount may be weighted based on one or more importance factors. Importance factors may include, for example, a weight based upon transfers to or from adjacent nodes outside the suspicious pattern. For example, if the current node has transferred $100.00 into the suspicious pattern but has also transferred $300.00 to nodes outside the suspicious pattern, the $100.00 may be weighted prior to a final importance determination in order to reflect that the suspicious pattern is not receiving a significant portion of funds sent from the current node. As an example, the $100.00 may be divided by the total, resulting in $100.00/($100.00+$300.00)=$25.00. Thus, when determining the total magnitude for purposes of importance, a system performing method 400 may sum the internal transactions, the outgoing transactions, and add $25.00 (to represent the weighted incoming transactions). Similar weights may be used when determining the internal transactions as well as the outgoing transactions.

Method 400 further comprises determining a timing of transactions at operation 406. Operation 406 may include reading timestamps from transactions. For example, a system performing method 400 may determine a date and time of incoming transactions, internal transactions, and/or outgoing transactions. The impact of the timing of the transactions may vary depending upon pattern and embodiment, as discussed below.

Method 400 further comprises determining an importance of the suspicious pattern based on the total magnitude and/or timing at operation 408. Operation 408 may include determining, based on the information determined via operations 404 and 406, whether or not the suspicious pattern is important. In other words, in some embodiments, importance may be a Boolean "Yes"/"No" designation. In some embodiments, importance may be a "score" calculated based on factors such as transaction magnitude, frequency, and the like. Operation 408 may include, for example, comparing the total transaction magnitude to a magnitude threshold and comparing the various transaction timings against a list of timing requirements. In some instances, both comparisons must be satisfied in order for operation 408 to include determining that the suspicious pattern is "important." For example, for a "fan-out" pattern, a transaction threshold may be $10,000.00 US, but all internal transactions must be within 10 seconds of one another. If the total amount of transactions exceeds $10,000.00 US but the transactions between nodes within the suspicious pattern are spread out over several days, operation 408 may include determining that the pattern is unimportant. Use cases wherein satisfying either condition may suffice for designating a pattern as "important" are also fully considered herein. In addition, in some embodiments, only one of magnitude and timing may be considered (e.g., one of operation 204 or operation 206 may be omitted).

Figure 5:
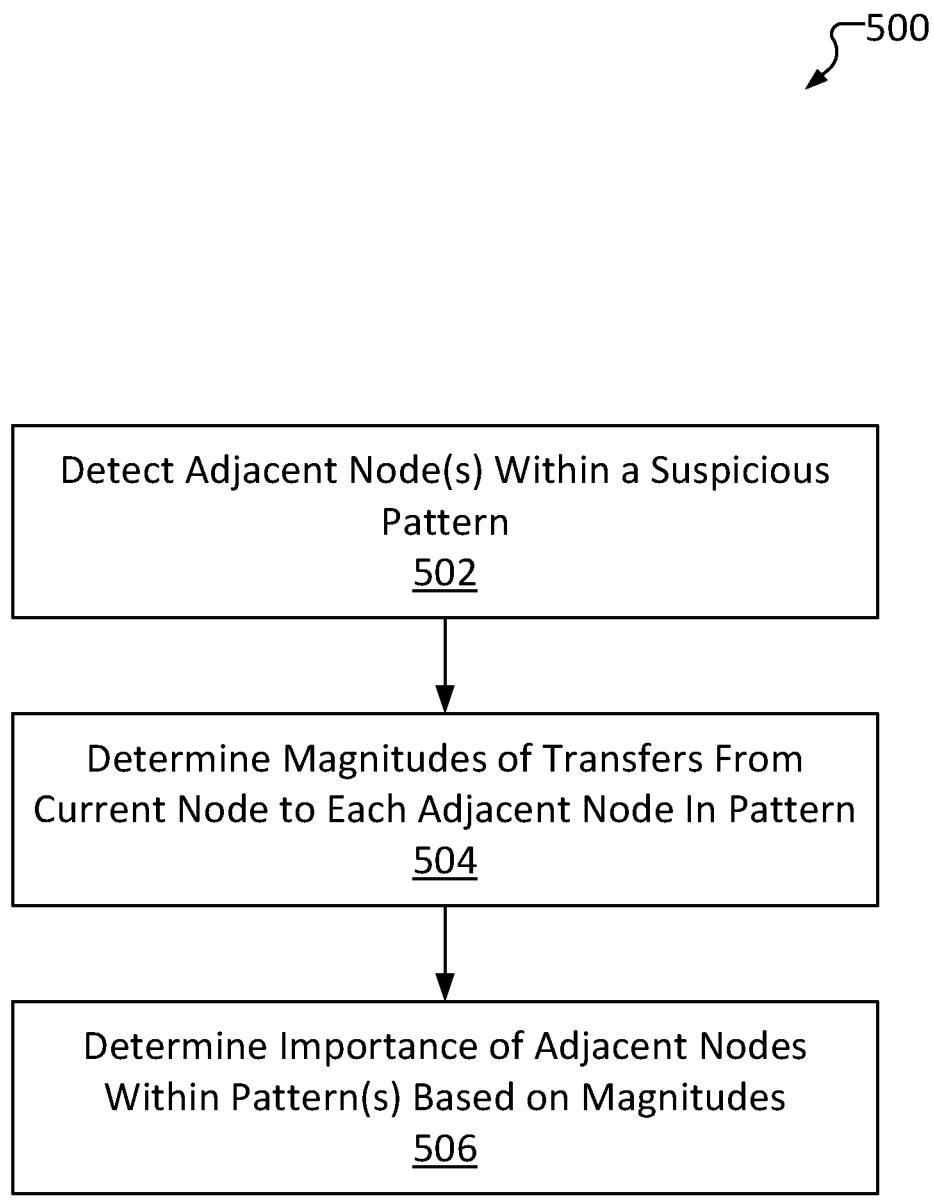
FIG. 5 is an example method of determining a node importance of a node within a suspicious pattern, consistent with several embodiments of the present disclosure.

FIG. 5 is an example method 500 of determining node importance of a node within a suspicious pattern, consistent with several embodiments of the present disclosure. Method 500 comprises detecting one or more nodes (adjacent to a current node) within a suspicious pattern at operation 502. Operation 502 may include, for example, identifying a list of adjacent nodes within suspicious patterns. In some embodiments, operation 502 may also include, for each adjacent node within a suspicious pattern, determining whether the suspicious patterns are important. In some embodiments, importance (or lack thereof) of the suspicious patterns may have been determined prior to method 500. Importance of the suspicious pattern may be determined via, for example, method 400 as described above with reference to FIG. 4.

Method 500 further comprises determining a magnitude of a transaction from the current node to each adjacent node within a suspicious pattern at operation 504. As a simple example, the current node may have transferred a first amount to a first node and transferred a second amount to a second node, where both nodes are within a single suspicious pattern. In such an example, operation 504 may include determining a magnitude of the first amount (for example, $32,050.00 US) and a magnitude of the second amount (for example, $450.00 US).

Operation 504 may include determining magnitudes of transfers to adjacent nodes in different suspicious patterns. For example, the current node may have performed a first transfer to a first node, a second transfer to a second node, a third transfer to the second node, a fourth transfer to a third node, and a fifth transfer to a fourth node. The first node may be within a first suspicious pattern (such as a "cycle" pattern), the second and third nodes may be within a second suspicious pattern (such as a "mule" pattern), and the fourth node may not be within any suspicious pattern. The first cycle and second mule suspicious patterns may have both been determined to be important suspicious patterns. Thus, operation 504 may include determining the magnitude of the first transfer (for example, $1,200.00 US), the magnitude of the second transfer (for example, $950.00 US), the magnitude of the third transfer (for example, $450.00 US), and the magnitude of the fourth transfer (for example, $500.00 US). Notably, the magnitude of the fifth transfer may not be considered, even if it is higher than the others (for example, $40,000.00 US). This is because the fourth adjacent node is not within a suspicious pattern, so regardless of transaction amount, the fifth transaction may be presumed "innocent."

Method 500 further comprises determining a node importance of adjacent nodes within important suspicious patterns based on the magnitudes at operation 506. In some instances, node importance may simply be represented by total transaction magnitude. As an example, a currently selected node may have sent a first transfer of $1,200.00 US to a first adjacent node. The currently selected node may have also sent funds to a second adjacent node on two occasions (e.g., a second $950.00 US transfer and a third $450.00 US transfer). The currently selected node may have also sent a fourth transfer of $500.00 US to a third node. In such an example, operation 506 may include determining the total amount sent to each adjacent node (e.g., summing the second and third transfers; $950.00+$450.00=$1,400.00) in order to determine the importance of each adjacent node.

In some embodiments, operation 506 may account for additional factors, such as degree of the adjacent nodes, timing of transfers to the adjacent nodes, etc. Further, in some embodiments, operation 506 may include weighting the node importance based on other information such as, for example, relative importance of multiple suspicious patterns. For example, if a first "cycle" pattern is twice as important than a second "mule" pattern, then a node importance of a node within the first pattern may be doubled.

Figure 6:
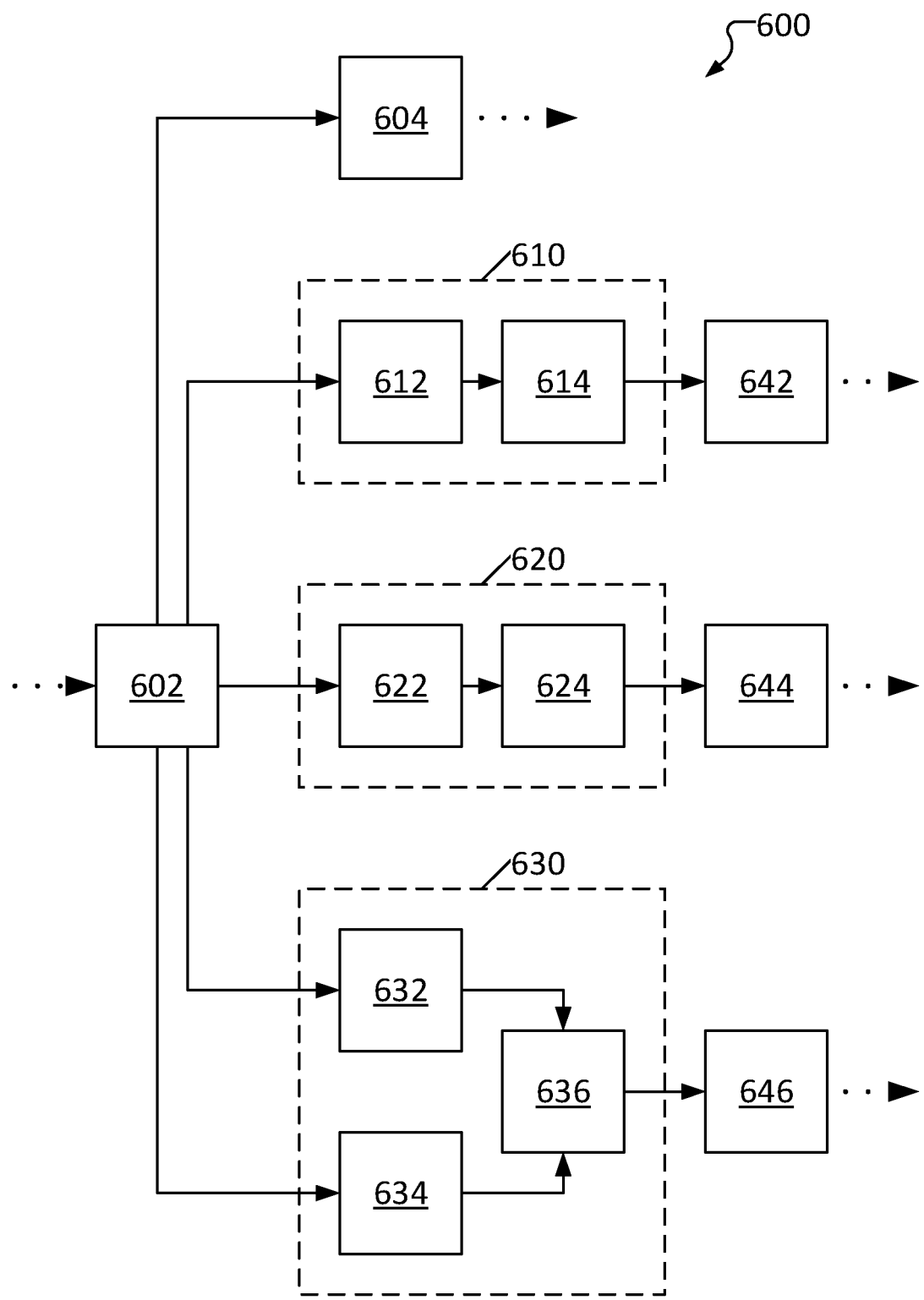
FIG. 6 is a diagram of an example transaction subnetwork including multiple adjacent nodes within different suspicious patterns, consistent with several embodiments of the present disclosure.

FIG. 6 is a diagram of an example transaction subnetwork 600 including multiple adjacent nodes within different suspicious patterns, consistent with several embodiments of the present disclosure. Subnet 600 is provided as an illustrative example of why importance of different suspicious patterns may be compared.

Subnet 600 includes several suspicious patterns 610, 620, and 630. As would be understood by one of ordinary skill in the art, suspicious patterns are often more complex than those depicted in FIG. 6. However, in the interest of brevity and for ease of explanation, suspicious patterns 610, 620, and 630 are exceedingly simple examples (e.g., only including two or three nodes each). Discussion of subnet 600 utilizes the same transaction notation as described above with reference to FIG. 3; a transfer from node 602 to node 604 is denoted [602]-[604], and so on. In the interest of brevity, unless stated otherwise, the examples discussed below with reference to FIG. 6 base "importance" solely on transfer magnitude. However, as described throughout this disclosure, other considerations may also be considered when determining importance (transfer timing, transfer frequency, etc.).

Currently selected node 602 may be adjacent to five nodes: node 604, node 612, node 622, node 632, and node 634. Node 604 is not within any suspicious pattern. Node 612 is within a first suspicious pattern 610. Node 622 is within a second suspicious pattern 620. Node 632 and node 634 are both within a third suspicious pattern 630. A system performing a walk of subnet 600 may need to select an adjacent node to walk to next. As node 604 is not within any suspicious pattern, it may be disqualified from selection at first. Thus, the system may need to select one of nodes 612, 622, 632, and 634 to walk to next. In order to select a next node to walk to, a system walking subnet 600 may determine importance of each of suspicious patterns 610, 620, and 630. Importance may be determined via, for example, method 400 as described above with reference to FIG. 4.

For example, a system may determine a magnitude of transfer [602]-[612], representing an amount of funds transferred into suspicious pattern 610. The system may also determine an amount of transfer [612]-[614], representing an amount of funds transferred within pattern 610. The system may also determine an amount of transfer [614]-[642], representing an amount of funds transferred from nodes within pattern 610 to nodes external to pattern 610. The system may repeat this analysis for pattern 620 and for pattern 630.

As an example, for pattern 610, a magnitude of transfer [602]-[612] may be $40,000.00 US, a magnitude of transfer [612]-[614] may be $30,000.00 US, and a magnitude of transfer [614]-[642] may be $30,000.00 US. Thus, a total of $100,000.00 US may have been transferred into, within, and out of pattern 610.

For pattern 620, a magnitude of transfer [602]-[622] may be $10.00 US, a magnitude of transfer [622]-[624] may be $150.00 US, and a magnitude of transfer [624]-[644] may be $40.00 US. Thus, a total of $200.00 US may have been transferred into, within, and out of pattern 620.

For pattern 630, a magnitude of transfer [602]-[632] may be $20,000.00 US, a magnitude of transfer [602]-[634] may be $42,000.00 US, a magnitude of transfer [632]-[636] may be $500.00 US, a magnitude of transfer [634]-[636] may be $2,000.00 US, and a magnitude of transfer [636]-[646] may be $15,500.00 US. Thus, a total of $80,000.00 US may have been transferred into, within, and out of pattern 630.

These totals may be compared to a pattern importance threshold, such as, for example, $45,000.00 US. As the amounts corresponding to pattern 610 and pattern 630 are greater than the pattern threshold but the amount corresponding to pattern 620 is below the pattern importance threshold, adjacent node 622 may be "disqualified" from selection as the next node of the walk. However, the system may still need to select one of nodes 612, 632, and 634.

In order to select a next node, the system may determine a node importance for each of adjacent nodes 612, 632, and 634. Node importance may be determined via, for example, method 500 as discussed above with reference to FIG. 5. In simple examples, node importance may simply depend upon transfer magnitude; thus, the system may select node 634, as the magnitude of transfer [602]-[634] ($42,000.00 US) is greater than the magnitude of transfer [602]-[612] ($40,000.00 US) and the magnitude of transfer [602]-[632] ($20,000.00 US).

However, in some embodiments, pattern importance may be more significant for selection than node importance. For example, the system may determine that, as the total magnitude of funds transferred into, within, and out of pattern 610 ($100,000.00 US) is greater than the total magnitude of funds transferred into, within, and out of pattern 630 ($80,000.00 US), that pattern 610 should be walked before pattern 630, and therefore select node 612 as the next node (even though node 634 received a larger magnitude of funds than node 612). In some embodiments, nodes 632 and 634 may have been disqualified from selection once pattern 610 is determined to be the most important, advantageously conserving resources that would have otherwise been used to determining node importance of nodes 632 and 634.

In some embodiments, node importance may be weighted by pattern importance. As an example, the magnitude of transfer [602]-[612] ($40,000.00 US) may be added to the total magnitude of funds transferred into, within, and out of pattern 610 ($100,000.00 US), resulting in a "weighted" node importance ($140,000.00 US) for node 612. Node 634's "weighted" node importance, if calculated the same way, might be $42,000.00 US+$80,000.00 US=$122,000.00 US. Thus, a system utilizing this selection method may select node 612. Other possibilities are also considered, such as, for example, weighting node importance by a ratio of pattern importance to a sum of all pattern importance values, and the like. These considerations may be implemented as part of, for example, operations 212-214 as discussed above with reference to FIG. 2.

If none of suspicious patterns 610, 620, and 630 are important, the system may select from any of the five adjacent nodes (including node 604, which was initially disqualified for not being within a suspicious pattern).

Figure 7:
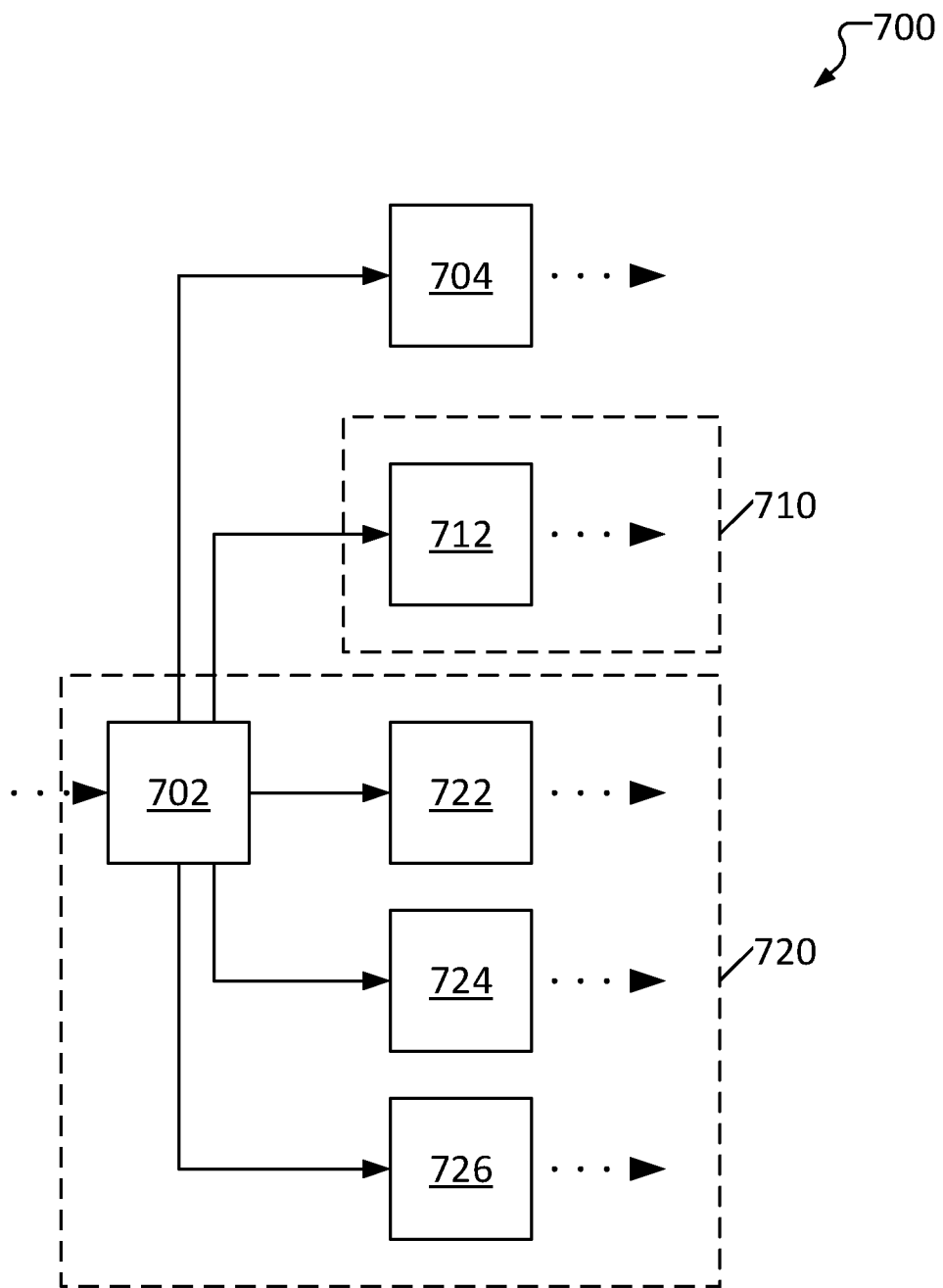
FIG. 7 is a diagram of an example transaction subnetwork including multiple adjacent nodes within different suspicious patterns wherein a currently selected node is within one of the suspicious patterns, consistent with several embodiments of the present disclosure.

FIG. 7 is a diagram of an example transaction subnetwork 700 including multiple adjacent nodes within different suspicious patterns wherein a currently selected node 702 is within one of the suspicious patterns 720, consistent with several embodiments of the present disclosure.

Subnet 700 includes suspicious patterns 710 and 720. As would be understood by one of ordinary skill in the art, suspicious patterns are often more complex than those depicted in FIG. 7. However, in the interest of brevity and for ease of explanation, suspicious patterns 710 and 720 are exceedingly simple examples. Discussion of subnet 700 utilizes the same transaction notation as described above with reference to FIG. 3 and FIG. 6; a transfer from node 702 to node 704 is denoted [702]-[704], and so on. In the interest of brevity, unless stated otherwise, the examples discussed below with reference to FIG. 7 base "importance" solely on transfer magnitude. However, as described throughout this disclosure, other considerations may also be considered when determining importance (transfer timing, transfer frequency, etc.).

Currently selected node 702 may be adjacent to five nodes: node 704, node 712, node 722, node 724, and node 726. Node 704 is not within any suspicious pattern. Node 712 is within a first suspicious pattern 710. Node 722, node 724, and node 726 are all within a second suspicious pattern 720. Notably, currently selected node 702 is also within the second suspicious pattern 720.

A system performing a walk of subnet 700 may need to select an adjacent node to walk to next. As node 704 is not within any suspicious pattern, it may be disqualified from selection at first. Thus, the system may need to select one of nodes 712, 722, 724, and 726 to walk to next. In some embodiments, in order to select a next node to walk to, a system walking subnet 700 may determine importance of suspicious pattern 710 and suspicious pattern 720 and node importance of nodes 712 and 722-726, in a manner similar to that discussed above with reference to subnet 600 of FIG. 6.

However, it may be particularly advantageous to, where possible, continue walking within the same suspicious pattern, provided that suspicious pattern is important. This may further enable more detailed analysis and reliable results. Thus, in some embodiments, as node 702 is within a suspicious pattern 720, a system walking subnet 700 may determine an importance of suspicious pattern 720 and determine whether that importance is above a pattern importance threshold. If suspicious pattern 720 is important, the system may restrict its search to adjacent nodes within suspicious pattern 720 (i.e., nodes 722, 724, and 726) without considering any other adjacent nodes.

In other words, in some embodiments, so long as pattern 720 is at least above the threshold to be considered "important," then even if pattern 710 is significantly more important than pattern 720 (and/or even if node 712 is significantly more important than any of nodes 722, 724, and 726), the walk of subnet 700 may remain within suspicious pattern 720. The system may then select from amongst nodes 722-726 in a manner similar to those discussed above with reference to, for example, operations 212-214 of FIG. 2, method 500 of FIG. 5, subnet 600 of FIG. 6, etc.

If suspicious pattern 720 is not important but suspicious pattern 710 is important, it may be advantageous to "switch" from pattern 720 to pattern 710 by selecting node 712 to walk to next. This is because unimportant suspicious patterns are essentially analogous to "false positives," and thus analyzing them may not be particularly useful at all. Therefore, walking from an unimportant pattern to an important pattern, when possible, may be preferable. However, in some embodiments, walking unimportant suspicious patterns is at least preferable to walking to nodes that are not within any suspicious pattern at all (in case of a "false false positive," such as where the pattern importance threshold is improperly high).

Figure 8:
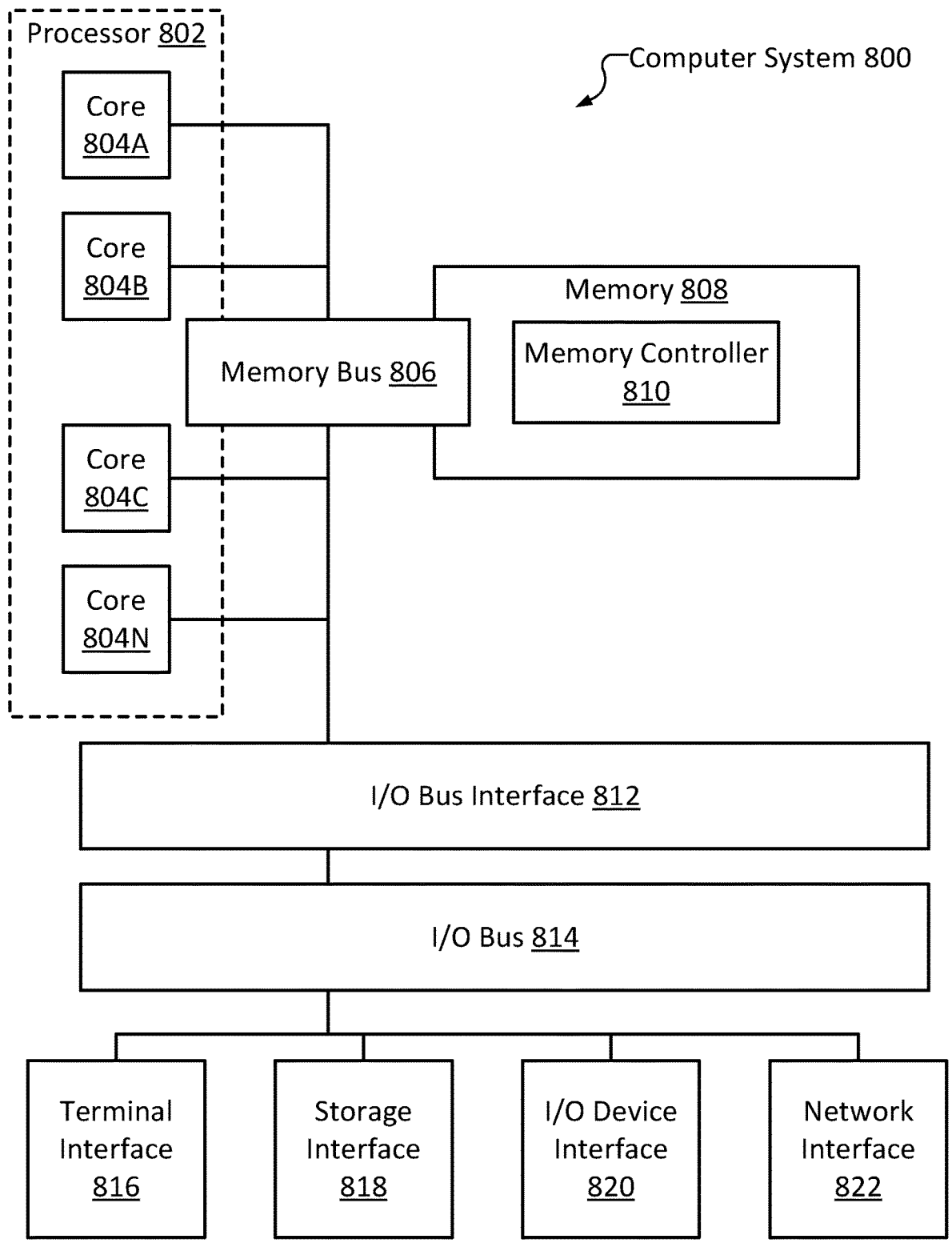
FIG. 8 illustrates a high-level block diagram of an example computer system that may be used in implementing embodiments of the present disclosure.

Referring now to FIG. 8, shown is a high-level block diagram of an example computer system 800 that may be configured to perform various aspects of the present disclosure, including, for example, methods 100, 400, and 500. The example computer system 800 may be used in implementing one or more of the methods or modules, and any related functions or operations, described herein (e.g., using one or more processor circuits or computer processors of the computer), in accordance with embodiments of the present disclosure. In some embodiments, the major components of the computer system 800 may comprise one or more processors (such as a central processing unit (CPU)) 802, a memory subsystem 808, a terminal interface 816, a storage interface 818, an I/O (Input/Output) device interface 820, and a network interface 822, all of which may be communicatively coupled, directly or indirectly, for inter-component communication via a memory bus 806, an I/O bus 814, and an I/O bus interface unit 812.

The computer system 800 may contain one or more general-purpose programmable central processing units (CPUs) 802, some or all of which may include one or more cores 804A, 804B, 804C, and 804D, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 808 on a CPU core 804 and may comprise one or more levels of on-board cache.

In some embodiments, the memory subsystem 808 may comprise a random-access semiconductor memory, storage device, or storage medium (either volatile or non-volatile) for storing data and programs. In some embodiments, the memory subsystem 808 may represent the entire virtual memory of the computer system 800 and may also include the virtual memory of other computer systems coupled to the computer system 800 or connected via a network. The memory subsystem 808 may be conceptually a single monolithic entity, but, in some embodiments, the memory subsystem 808 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 808 may contain elements for control and flow of memory used by the CPU 802. This may include a memory controller 810.

Although the memory bus 806 is shown in FIG. 8 as a single bus structure providing a direct communication path among the CPU 802, the memory subsystem 808, and the I/O bus interface 812, the memory bus 806 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 812 and the I/O bus 814 are shown as single respective units, the computer system 800 may, in some embodiments, contain multiple I/O bus interface units 812, multiple I/O buses 814, or both. Further, while multiple I/O interface units are shown, which separate the I/O bus 814 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 800. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   selecting a subnet of a transaction network, the subnet comprising nodes and transactions represented by connections between the nodes, wherein the nodes in the subnet comprise a start node, an end node, and all nodes between the start node and the end node;
   comparing, by a pattern matching algorithm, patterns of the connections between the nodes in the subnet with suspicious patterns of connections representing transactions between nodes in a database, wherein the suspicious patterns of connections are associated with fraudulent activity;
   detecting at least one suspicious pattern of the connections between the nodes in the subnet based on the comparing;
   walking nodes in the subnet based on the at least one suspicious pattern, wherein the walking comprises:
   selecting the start node;
   analyzing transactions carried out by the start node;
   identifying, based on the analyzing the transactions carried out by the start node, a first set of nodes adjacent to the start node;
   determining, based on connections representing transactions between the start node and the first set of nodes, that a first adjacent node of the first set of nodes is included in a first suspicious pattern from the at least one suspicious pattern;
   selecting the first adjacent node in response to the determining; and
   analyzing transactions carried out by the first adjacent node;
   generating, based on the walking, a first node sequence of the subnet, the first node sequence including nodes selected based on the at least one suspicious pattern; and
   outputting the first node sequence packaged with information associated with the included nodes.

2. The method of claim 1, wherein the selecting the first adjacent node comprises:
   calculating a magnitude of transactions associated with the first suspicious pattern;
   comparing the magnitude to an importance threshold;
   determining, based on the comparing, that the magnitude exceeds the importance threshold; and
   determining, based on the determining that the magnitude exceeds the importance threshold, that the first suspicious pattern is a first important suspicious pattern.

3. The method of claim 2, wherein the selecting the first adjacent node further comprises:
   determining that a second suspicious pattern from the at least one suspicious pattern is a second important suspicious pattern;
   determining that a second adjacent node of the first set of nodes is included in the second suspicious pattern;
   calculating a first node importance of the first adjacent node and a second node importance of the second adjacent node; and
   determining that the first node importance is greater than the second node importance.

4. The method of claim 1, wherein the walking further includes updating an identifier registry to indicate that the first adjacent node has been selected.

5. The method of claim 1, wherein the walking further comprises:
identifying, based on the analyzing the transactions of the first adjacent node, a second set of nodes adjacent to the first adjacent node, the second set of nodes comprising a second adjacent node and a third adjacent node;
calculating a first degree of the second adjacent node and a second degree of the third adjacent node, wherein the calculating performed in response to determining that:
the second adjacent node is included in a second suspicious pattern from the at least one suspicious pattern and not included in the first suspicious pattern;
the second suspicious pattern is not an important suspicious pattern; and
the third adjacent node is not included in either the first or second suspicious patterns;
determining, based on the calculating, that the second degree is greater than the first degree; and
selecting, based on the second degree being greater than the first degree, the third adjacent node.

6. The method of claim 1, wherein the detecting includes:
receiving an example suspicious pattern from the suspicious patterns of connections;
performing, by the pattern matching algorithm, pattern matching based on the example suspicious pattern and the subnet;
identifying, based on the pattern matching, a potential suspicious pattern in the subnet; and
determining a pattern importance of the potential suspicious pattern.

7. The method of claim 1, wherein the first suspicious pattern is a fan-out pattern.

8. A system comprising:
a memory; and
a central processing unit (CPU) coupled to the memory, the CPU configured to:
select a subnet of a transaction network, the subnet comprising nodes and transactions represented by connections between the nodes, wherein the nodes in the subnet comprise a start node, an end node, and all nodes between the start node and the end node;
compare, by a pattern matching algorithm, patterns of the connections between the nodes in the subnet with suspicious patterns of connections representing transactions between nodes in a database, wherein the suspicious patterns of connections form arrangements associated with fraudulent activity;
detect at least one suspicious pattern of the connections between the nodes in the subnet based on the comparing;
walk nodes in the subnet based on the at least one suspicious pattern, wherein the walking comprises:
selecting the start node;
analyzing transactions carried out by the start node;
identifying, based on the analyzing the transactions carried out by the start node, a first set of nodes adjacent to the start node;
determining, based on connections representing transactions between the start node and the first set of nodes, that a first adjacent node of the first set of nodes is included in a first suspicious pattern from the at least one suspicious pattern; and
selecting the first adjacent node in response to the determining;
generate, based on the walking, a first node sequence of the subnet, the first node sequence including nodes selected based on the at least one suspicious pattern; and
output the first node sequence packaged with information associated with the included nodes.

9. The system of claim 8, wherein the selecting the first adjacent node comprises:
calculating a magnitude of transactions associated with the first suspicious pattern;
comparing the magnitude to an importance threshold;
determining, based on the comparing, that the magnitude exceeds the importance threshold; and
determining, based on the determining that the magnitude exceeds the importance threshold, that the first suspicious pattern is a first important suspicious pattern.

10. The system of claim 9, wherein the selecting the first adjacent node further comprises:
determining that a second suspicious pattern from the at least one suspicious pattern is a second important suspicious pattern;
determining that a second adjacent node of the first set of nodes is included in the second suspicious pattern;
calculating a first node importance of the first adjacent node and a second node importance of the second adjacent node; and
determine that the first node importance is greater than the second node importance.

11. The system of claim 8, wherein the walking further includes recording account information of an account associated with the first adjacent node.

12. The system of claim 8, wherein the walking further comprises:
identifying, based on the analyzing the transactions of the first adjacent node, a second set of nodes adjacent to the first adjacent node, the second set of nodes comprising a second adjacent node and a third adjacent node;
calculating a first degree of the second adjacent node and a second degree of the third adjacent node, wherein the calculating performed in response to determining that:
the second adjacent node is included in a second suspicious pattern from the at least one suspicious pattern and not included in the first suspicious pattern;
the second suspicious pattern is not an important suspicious pattern;
the third adjacent node is not included in either the first or second suspicious patterns; and
determining, based on the calculating, that the second degree is greater than the first degree; and
selecting, based on the second degree being greater than the first degree, the third adjacent node.

13. The system of claim 8, wherein the detecting includes:
receiving an example suspicious pattern from the suspicious patterns of connections;
performing pattern matching based on the example suspicious pattern and the subnet;
identifying, based on the pattern matching, a potential suspicious pattern in the subnet; and
determining a pattern importance of the potential suspicious pattern.

14. The system of claim 8, wherein the first suspicious pattern is a fan-out pattern.

15. A computer program product, the computer program product comprising a computer readable storage medium having program instructions embodied therewith, the program instructions executable by a computer to cause the computer to:

select a subnet of a transaction network, the subnet comprising nodes and transactions represented by connections between the nodes, wherein the nodes in the subnet comprise a start node, an end node, and all nodes between the start node and the end node;

compare, by a pattern matching algorithm, patterns of the connections between the nodes in the subnet of suspicious patterns of connections representing transactions between nodes in a database, wherein the suspicious patterns of connections form arrangements associated with fraudulent activity;

detect at least one suspicious pattern of the connections between the nodes in the subnet based on the comparing, wherein the at least one suspicious pattern forms an arrangement of the connections between the nodes in the subnet matching an arrangement from the arrangements associated with the fraudulent activity;

walk nodes in the subnet based on the at least one suspicious pattern, wherein the walking comprises:
        selecting the start node;
        analyzing transactions carried out by the start node;
        identifying, based on the analyzing the transactions carried out by the start node, a first set of nodes adjacent to the start node;
        determining, based on connections representing transactions between the start node and the first set of nodes, that a first adjacent node of the first set of nodes is included in a first suspicious pattern from the at least one suspicious pattern; and
        selecting the first adjacent node in response to the determining;

generate, based on the walking, a first node sequence of the subnet, the first node sequence including nodes selected based on the at least one suspicious pattern; and output the first node sequence packaged with information associated with the included nodes.

16. The computer program product of claim 15, wherein the selecting the first adjacent node comprises:
    calculating a magnitude of transactions associated with the first suspicious pattern;
    comparing the magnitude to an importance threshold;
    determining, based on the comparison, that the magnitude exceeds the importance threshold; and
    determining, based on the determining that the magnitude exceeds the importance threshold, that the first suspicious pattern is a first important suspicious pattern.

17. The computer program product of claim 16, wherein the selecting the first adjacent node further comprises:
    determining that a second suspicious pattern from the at least one suspicious pattern is a second important suspicious pattern;
    determining that a second adjacent node of the first set of nodes is included in the second suspicious pattern;
    calculating a first node importance of the first adjacent node and a second node importance of the second adjacent node; and
    determine that the first node importance is greater than the second node importance.

18. The computer program product of claim 15, wherein the walking further includes recording account information of an account associated with the first adjacent node.

19. The computer program product of claim 15, wherein the walking further comprises:
    identifying, based on the analyzing the transactions of the first adjacent node, a second set of nodes adjacent to the first adjacent node, the second set of nodes comprising a second adjacent node and a third adjacent node;
    calculating a first degree of the second adjacent node and a second degree of the third adjacent node, wherein the calculating is performed in response to determining that:
        the second adjacent node is included in a second suspicious pattern from the at least one suspicious pattern and not included in the first suspicious pattern;
        the second suspicious pattern is not an important suspicious pattern; and
        the third adjacent node is not included in either the first or second suspicious patterns;
    determining, based on the calculating, that the second degree is greater than the first degree; and
    selecting, based on the second degree being greater than the first degree, the third adjacent node.

20. The computer program product of claim 15, wherein the detecting includes:
    receiving an example suspicious pattern from the suspicious patterns of connections;
    performing pattern matching based on the example suspicious pattern and the subnet;
    identifying, based on the pattern matching, a potential suspicious pattern in the subnet; and
    determining a pattern importance of the potential suspicious pattern.

* * * * *